(12) United States Patent
Menin et al.

(10) Patent No.: US 7,786,404 B2
(45) Date of Patent: Aug. 31, 2010

(54) METHOD AND DEVICE FOR LASER WELDING

(75) Inventors: Roberto Menin, Vico Canavese (IT); Arturo Baroncelli, Grugliasco (IT); Enrico Mauletti, Turin (IT)

(73) Assignee: Comau S.p.A., Grugliasco (IT)

( * ) Notice: Subject to any disclaimer, the term of this patent is extended or adjusted under 35 U.S.C. 154(b) by 560 days.

(21) Appl. No.: 11/011,503

(22) Filed: Dec. 14, 2004

(65) Prior Publication Data
US 2005/0150876 A1 Jul. 14, 2005

(30) Foreign Application Priority Data

Dec. 18, 2003 (IT) .......................... TO2003A1017
May 28, 2004 (IT) .......................... TO2004A0362

(51) Int. Cl.
B23K 26/00 (2006.01)
(52) U.S. Cl. ............................ 219/121.63; 219/121.64; 219/121.85
(58) Field of Classification Search ............ 219/121.63, 219/121.64, 121.85, 121.6
See application file for complete search history.

(56) References Cited

U.S. PATENT DOCUMENTS

| 4,324,972 A | * | 4/1982 | Furrer et al. ............ 219/121.84 |
| 4,831,316 A | * | 5/1989 | Ishiguro et al. ............ 700/254 |
| 5,302,802 A | * | 4/1994 | Fujinaga et al. ........ 219/121.78 |
| 5,606,235 A | * | 2/1997 | Mauletti ...................... 318/625 |
| 6,324,015 B1 | * | 11/2001 | Fuse .......................... 359/662 |
| 6,608,281 B2 | * | 8/2003 | Ishide et al. ............ 219/121.78 |

FOREIGN PATENT DOCUMENTS

| EP | 0440001 | 8/1991 |
| EP | 0440002 | 8/1991 |
| EP | 0483385 | 5/1992 |
| EP | 0870571 | 10/1998 |
| EP | 1228835 | 8/2002 |
| EP | 1236535 | 9/2002 |
| EP | 1238748 | 9/2002 |
| EP | 1270139 | 1/2003 |
| JP | 08-025075 A | 1/1996 |
| JP | 2002-301585 A | 10/2002 |

OTHER PUBLICATIONS

European Search Report issued on Jul. 14, 2005 in connection with EP Application No. 04029273.2, corresponding to the above-referenced application.
Italian Patent Application No. TO2002A000760 filed Sep. 2, 2002 in the name of Comau S.p.A.

* cited by examiner

*Primary Examiner*—M. Alexandra Elve
(74) *Attorney, Agent, or Firm*—Young Basile

(57) ABSTRACT

A plurality of stretches of laser weld are executed on a structure to be welded by means of a device for focusing and orientation of the laser beam, which is associated to a component element of a manipulator robot. The focusing head is kept in the proximity of, but not closely adjacent to, the different areas to be welded and can consequently follow a simplified path, whilst the device for orientation of the laser beam aims the latter on the different areas of the structure to be welded, so that the speed of travel of the laser beam spot along the longitudinal direction of the weld stretch is independent from the speed of travel of the robot end element.

19 Claims, 5 Drawing Sheets

METHOD AND DEVICE FOR LASER WELDING

BACKGROUND OF THE INVENTION

The present invention relates to methods and devices for laser welding, particularly for the welding of structures made of sheet metal constituting assemblies or subassemblies of bodies or frames of motor-vehicles.

The present applicant has proposed for some time now (see, for example, the European patents Nos. EP 0440001 B1 and EP 0440002 B1 regarding the so-called "LASERGATE" system) devices for the laser welding of motor-vehicle structures. The use of laser welding for said applications did, however, not find a particularly wide diffusion immediately after its first proposal, in the early nineties. This is due principally to the fact that the experiments conducted with the first embodiments of laser-welding devices demonstrated the existence of a wide range of problems connected to said technology.

A first important problem derives from the widespread use, in the automotive field, of sheet steel provided with an outer zinc-coated protective layer. Said layer gives rise to the generation of zinc vapours during the laser-welding operation, which frequently render it problematical to obtain a good-quality weld.

The above problem has been addressed and illustrated extensively in the European patent applications Nos. EP 1238748 A1 and EP 1236535 A1, filed in the name of the present applicant, where there are illustrated devices that are able to overcome, in a simple and efficient way, the aforesaid technical obstacle, by guaranteeing ways of escape for the zinc vapours that are formed during the process of welding. Another solution to the problem constituted by zinc vapours has also been proposed in the Italian patent application No. TO2002A000760, filed in the name of the present applicant.

It, however, required some time for the aforesaid technical problem to be recognized, studied, and solved in a complete way, a fact that explains, at least in part, the length of the period of gestation of the use of laser welding in the automotive field.

Another important problem that it is necessary to take into account in the application of laser welding to the assembly of motor-vehicle structures is linked to the need to guarantee a high quality of assembly with reduced production times. A station for assembly of a motor-vehicle body or for its subassembly typically comprises a plurality of locating elements and clamping equipment that ensure correct positioning of the elements of sheet metal constituting the structure during the welding step. There exists, of course, a minimum limit to the number of pieces of clamping equipment that can be provided for said purpose, below which the geometry of the structure is not adequately guaranteed, with the consequence of an insufficient quality of the assembly operation. It follows that the welding station is relatively "crowded" by a set of clamping equipment, with the corresponding control devices for manoeuvring said equipment between an open, inoperative, condition and a closed, operative, condition. Added to this is the fact that, in the case of flexible welding stations, capable of operating on different types or models or versions of structure to be welded, the welding station is also provided with means for guiding and controlling different structures for supporting the clamping equipment, which are rapidly interchangeable with one another according to the type of body or subassembly that each time arrives in the welding station. The consequent relative complexity of the structure of the welding station and of its parts obviously renders more difficult the work of the manipulator robots that are used for carrying the welding means (electrical welding guns or yokes in the conventional case, laser heads in the case of laser welding) in the proximity of the various areas of the structure to be welded.

Both in the case of the traditional technology using electrical welding guns and in the case of laser welding, the robot must move successively into a series of areas of the structure to be welded for executing the welds that are assigned to it. Consequently, after the structure to be welded has arrived in the welding station, it must remain in said station for a time at least sufficient to enable each robot to perform all the welds assigned to it. Obviously, the time of stay in the welding station could be reduced by increasing the number of robots, but also in this case there exists a limit to said possibility, which is due both to reasons of costs, and to the fact that, above a certain number of robots, each of the robots becomes an obstacle to the operativeness of one or more robots adjacent to it.

On the other hand, the time used by each robot for making all the welds assigned is represented not only by the sum of the times necessary for making the various welds, but also by the time occupied on each occasion for coming into the area to be welded, and said time cannot be negligible, above all when the robot is forced to follow, for the purpose, a relatively tortuous path, it being necessary to prevent any interference whether with the parts of the structure to be welded or with the various pieces of clamping equipment engaged thereon.

It is necessary to consider, on the other hand, that, at the outset of the application of laser technology to the welding of motor-vehicle structures, the laser generators available were relatively less efficient and less powerful than the ones that are, instead, currently available. With the first-generation laser generators, it was in any case necessary to guarantee a position of the laser head carried by the robot that was relatively close to the structure to be welded, so that the application of laser technology did not yield particular advantages, from this standpoint, as compared to the traditional electric spot-welding techniques. With the currently available laser systems, instead, there are opened fresh, encouraging prospects in the direction of an important reduction in production times.

The idea that underlies said evolution and has formed the subject of initial experiments conducted by the present applicant consists in maintaining the laser head at a certain distance from the structure to be welded and in providing means that will enable focusing of the laser beam in different areas of the structure to be welded, without modifying the position of the laser head. This is, of course, exploited not only for moving the laser beam with respect to the structure to be welded in a given area, for the purpose of performing a welding stretch, or welding bead, but also and above all for welding different areas of the structure, without moving the head carried by the robot. A solution in this direction has been proposed by the present applicant in the European patent application No. EP1228835A1 (A system and method of remote laser welding), of which the present applicant is co-owner. Said known system is applied, however, to a "Cartesian" robot, not to a robot of an "anthropomorphic" type, and is "added", and not integrated, in the robot.

SUMMARY OF THE INVENTION

The purpose of the present invention is to provide an improved laser-welding method and device, which will be able to exploit the aforesaid underlying idea in a simple and efficient way for the purpose of enabling laser welding of structures such as motor-vehicle bodies or their subassemblies by guaranteeing a high welding quality, but at the same time reducing production times considerably.

According to the invention, said purpose is achieved through the method referred to in claim 1 and/or through a device according to claim 4.

Further advantageous characteristics of the invention are indicated in the dependent claims.

The possibility of keeping the focusing head at a distance from the workpiece to be welded enables considerable simplification of the path of the head carried by the robot during the execution of the weld. During the welding step, the laser head "flies over", at a distance, the workpiece to be welded, whilst simultaneously the focused laser beam is oriented in various ways for executing the stretches of weld in the different areas of the workpiece. During each welding operation, the movement of the focused laser beam is thus a complex movement that is the resultant of the sum of the movement of the robot and of the movement of orientation of the laser beam with respect to the laser head. It follows that the movement of the robot and the scanning device that orients the direction of aiming of the focused laser beam must be controlled in a co-ordinated way in order to obtain the desired result.

It is to be noted that EP 0 483 385 A1 discloses a laser welding device wherein the laser beam is oriented according to a path and a speed which are independent from the path and speed of the end element of the robot. However in this known device the aforesaid concept is exploited merely to impart periodic and cyclic oscillations to the laser beam whilst the end element of the robot is moved in the longitudinal direction of the stretch of weld to be carried out. Therefore, in this known device the movement of the laser beam in the longitudinal direction of the stretch of weld is univocally determined by the speed of the end element of the robot. In the case of the present invention, the speed of movement of the laser beam spot along the longitudinal direction of the stretch of weld can be controlled instead at will, independently from the speed of movement of the robot end element.

BRIEF DESCRIPTION OF THE DRAWINGS

Further characteristics and advantages of the invention will emerge from the ensuing description, with reference to the annexed drawings, which are provided purely by way of non-limiting example and in which.

DETAILED DESCRIPTION OF THE INVENTION

Figure 1:
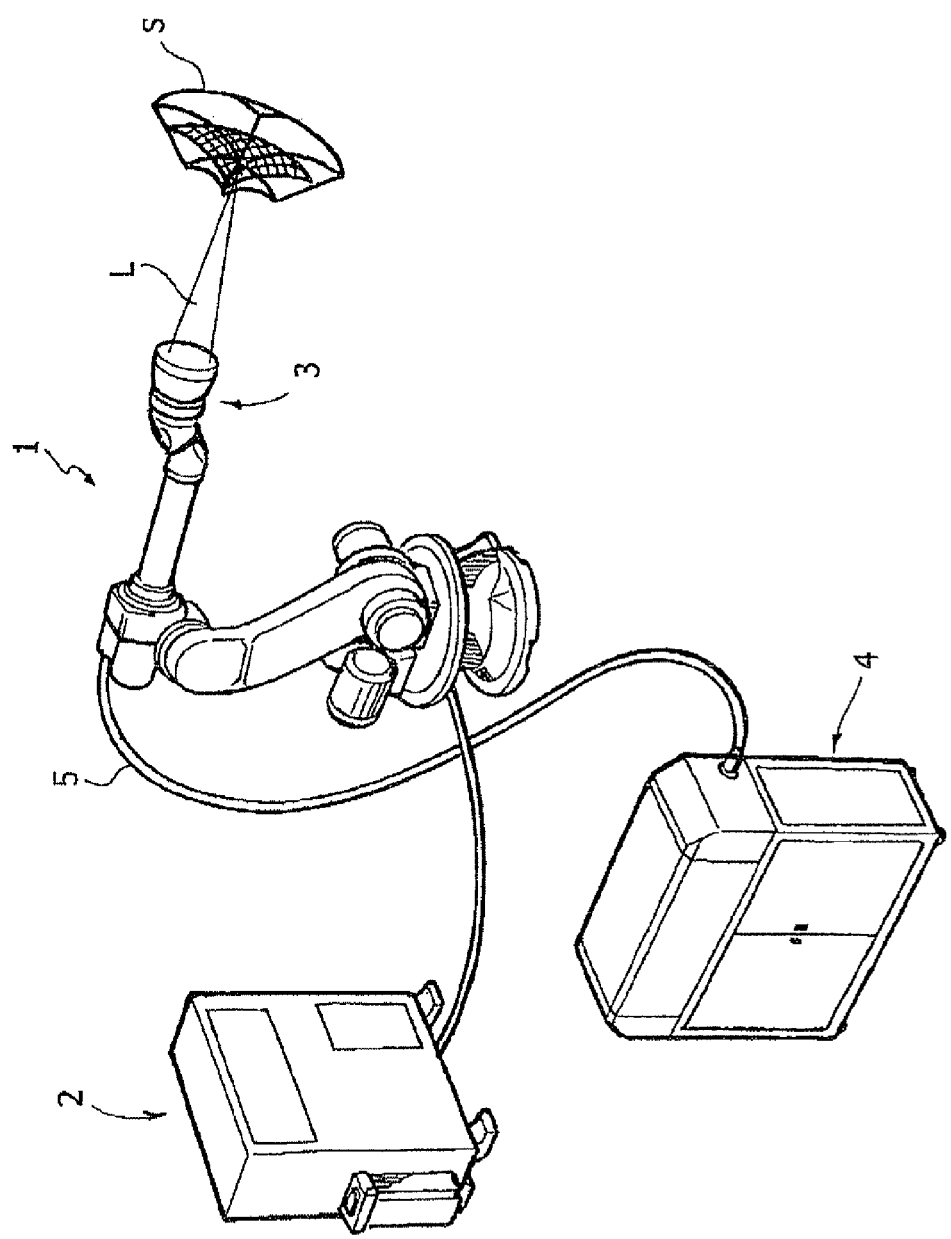
FIG. 1 is a perspective view of a manipulator robot according to a first embodiment of the present invention.

In FIG. 1, the reference number 1 designates, as a whole, a manipulator robot of any known type. The present applicant has for some time now produced and marketed manipulator robots of an "anthropomorphic" type, which use a set of elements mounted so that they can turn or are articulated with respect to the others according to a respective set of axes (typically six). To each of said axes there is associated an electric control motor. The electric motors are controlled by a control unit 2 connected to the robot. The unit 2 is able to control the electric motors so as to move, in space, the articulated structure of the robot carrying the extreme end of the robot, or "wrist" of the robot, in any point of a space of predetermined shape and dimensions. In the case of the first embodiment of the invention, in the end element of the robot there is integrated a device 3 for focusing and orienting the direction of aiming of a laser beam. The robot 1 is in fact associated to a laser generator 4, which is preferably of the solid-state type. The laser beam at output from the generator 4 is guided by means of an optical fibre, or a bundle of optical fibres, 5 up to the focusing and aiming device 3. An important characteristic of the invention lies in the fact that the end part of the optical fibre 5 is integrated within the structure of the robot, as may be seen in FIG. 3. The optical fibre 5 terminates with an optical-torch device 6, of a type in itself known. In the case of the solution illustrated in FIG. 3, from the torch 6 there issues a divergent laser beam 7, which is then collimated by a first lens 8. The collimated beam 9 is received by a lens 10, which issues, at output, a divergent beam 11. The lens 10 is mounted axially in a slidable way by means of a slide 12 in the structure 13 of an element of the robot. The movement of the slide 12 is controlled by an electric actuator (not shown) of any known type, which likewise is controlled by a second programmable electronic control unit. In the case of the shown embodiment, this second control unit is integrated in the control unit 2 of the robot. It is however well possible that a second control unit is provided which is separate from the robot control unit and cooperating therewith. The divergent beam 11 is received by a second collimating lens 14, which issues, at output, a collimated beam 15 that enters a scanning device 16 for orientation of the direction of aiming. The scanning device 16 comprises, in succession, two reflecting mirrors 17, 18 respectively orientable about an axis 19 and an axis 20, which are orthogonal to one another and not coplanar and which enable orientation of the beam in any direction in space. Of course, the two mirrors 17, 18 could also be replaced by a single mirror orientable about two orthogonal axes. The movements of the two mirrors 17, 18 are controlled by electric actuators of any type (not illustrated), controlled by the second control unit for orienting the laser beam each time in the desired direction. The laser beam 15, after being reflected in succession by the mirrors 17, 18, arrives at a lens 21, which focuses the beam in a point F of the surface of a work piece 22. In the case of the example shown in FIG. 3, the lens 21 is of the so-called F-theta type, which is known per se, which is able to focus the beam always in a point belonging to the plane of the surface of the work piece 22, whatever the direction of orientation of the beam.

Figure 3:
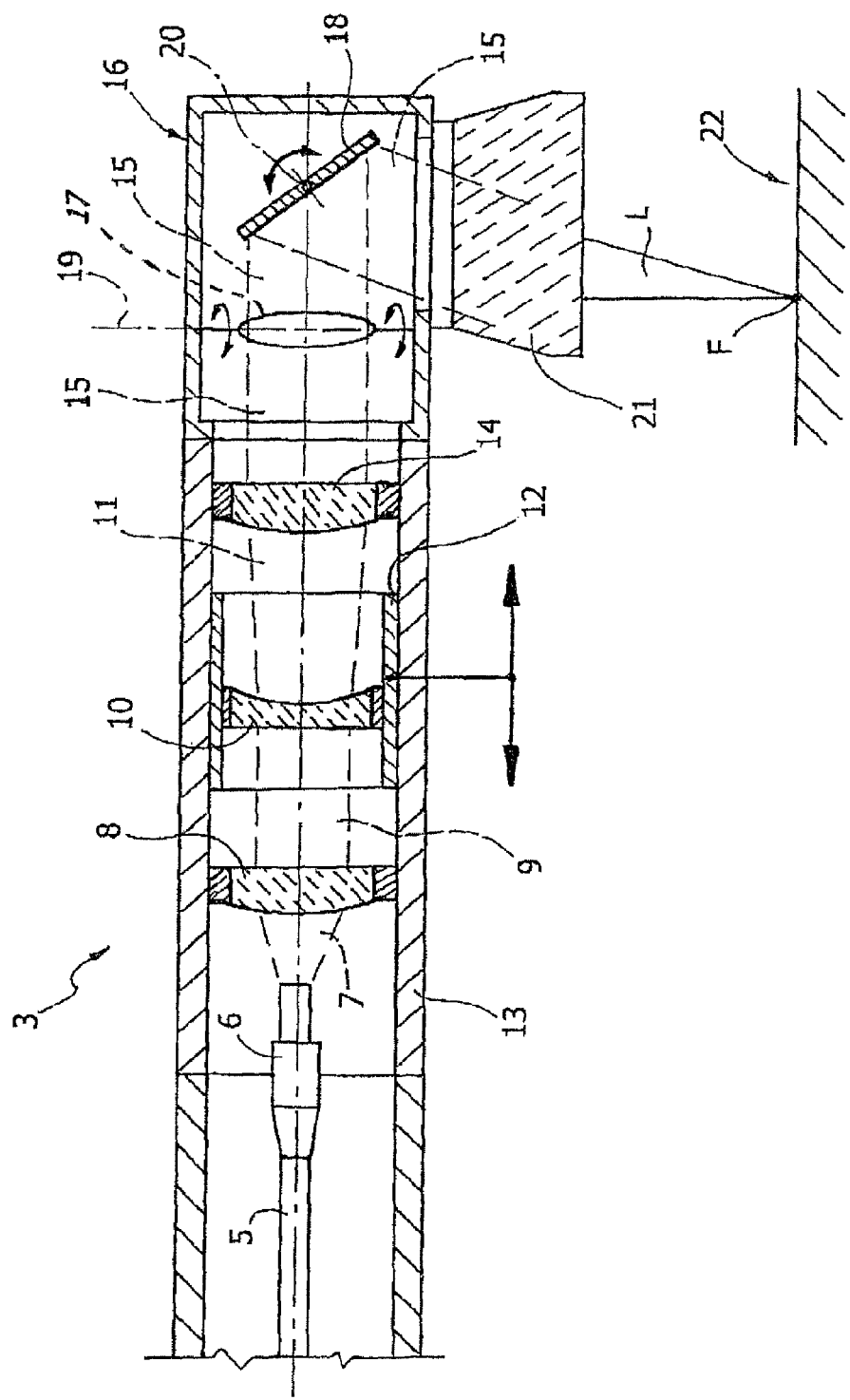
FIG. 3 is a schematic cross-sectional view that shows the terminal part of the robot of FIG. 1.

By controlling the orientation of the mirrors 17, 18, it is possible to orient the direction of aiming of the final focused laser beam, designated by L in FIG. 3. By adjusting the axial position of the lens 10, moreover, it is possible to adjust the focusing distance.

Thanks to the arrangement described above, for a fixed position of the element 13 of the robot, the focused beam L can be pointed in different directions, so as to focus on any point F of a solid, schematically represented in FIG. 1 and designated by S.

Figure 2:
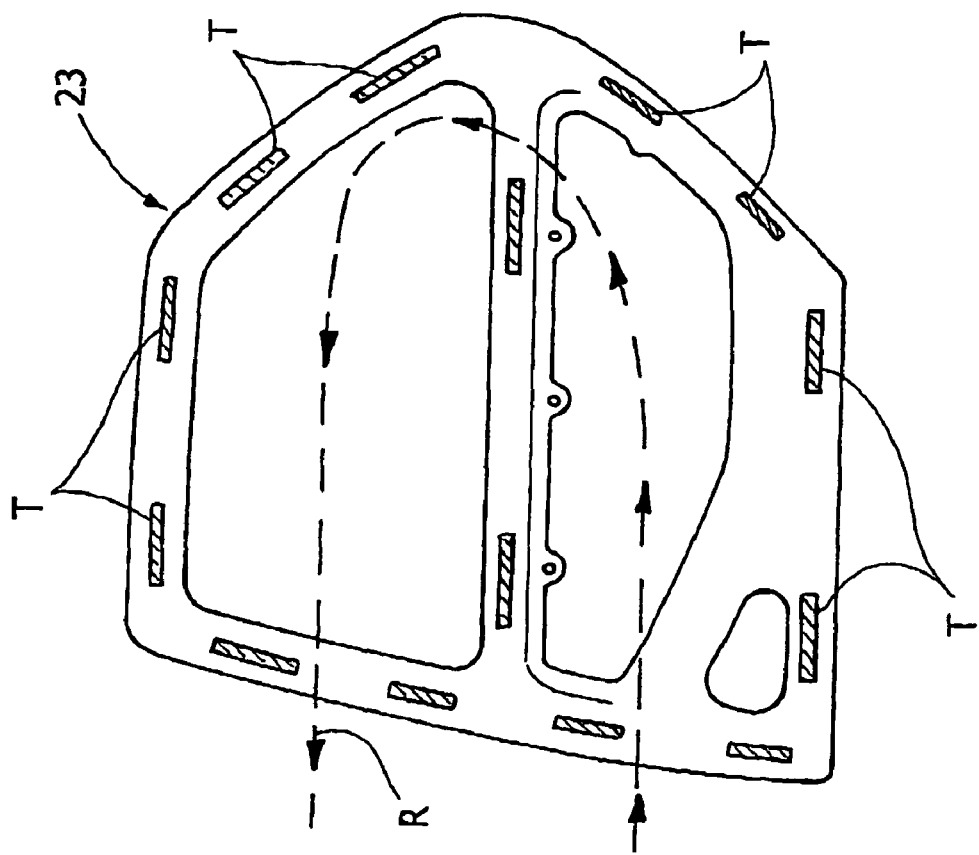
FIG. 2 is a schematic view of a structure to be welded and of the various areas in which the stretches of laser welding are to be performed and of the path followed by the head carried by the robot during the welding cycle.

Using the device of FIGS. 1, 3, it is possible, for example, to perform a succession of welding stretches T of a structure 23 to be welded by moving the extreme end of the robot simply according to the path designated by R in FIG. 2. Whilst the extreme end of the robot is displaced along the path R, it is kept at a distance from the workpiece 23 and is able to execute the various welding stretches T thanks to the possibility of orientation of the focused beam L, obtained by means of the device 3. Whilst the robot "passes over" the workpiece, the device 3 orients the laser beam adequately so as to "illuminate" the various welding areas in succession. The movements are co-ordinated for the purpose of optimizing the production times. During the movement of the robot, the laser beam is hence able to "proceed" faster than the robot, anticipating its movement, or also to keep a given area of the workpiece still "illuminated", whilst the robot has already moved on.

Obviously, obtaining the aforesaid result implies the need for an adequate programmed electronic control for controlling both the movements of the robot and the movements of the mobile parts of the device 3. According to the invention, the above mentioned second electronic control unit is provided, which may be either integrated into or separate from the robot control unit and cooperating therewith for performing both of the aforesaid operations of control.

Figure 4:
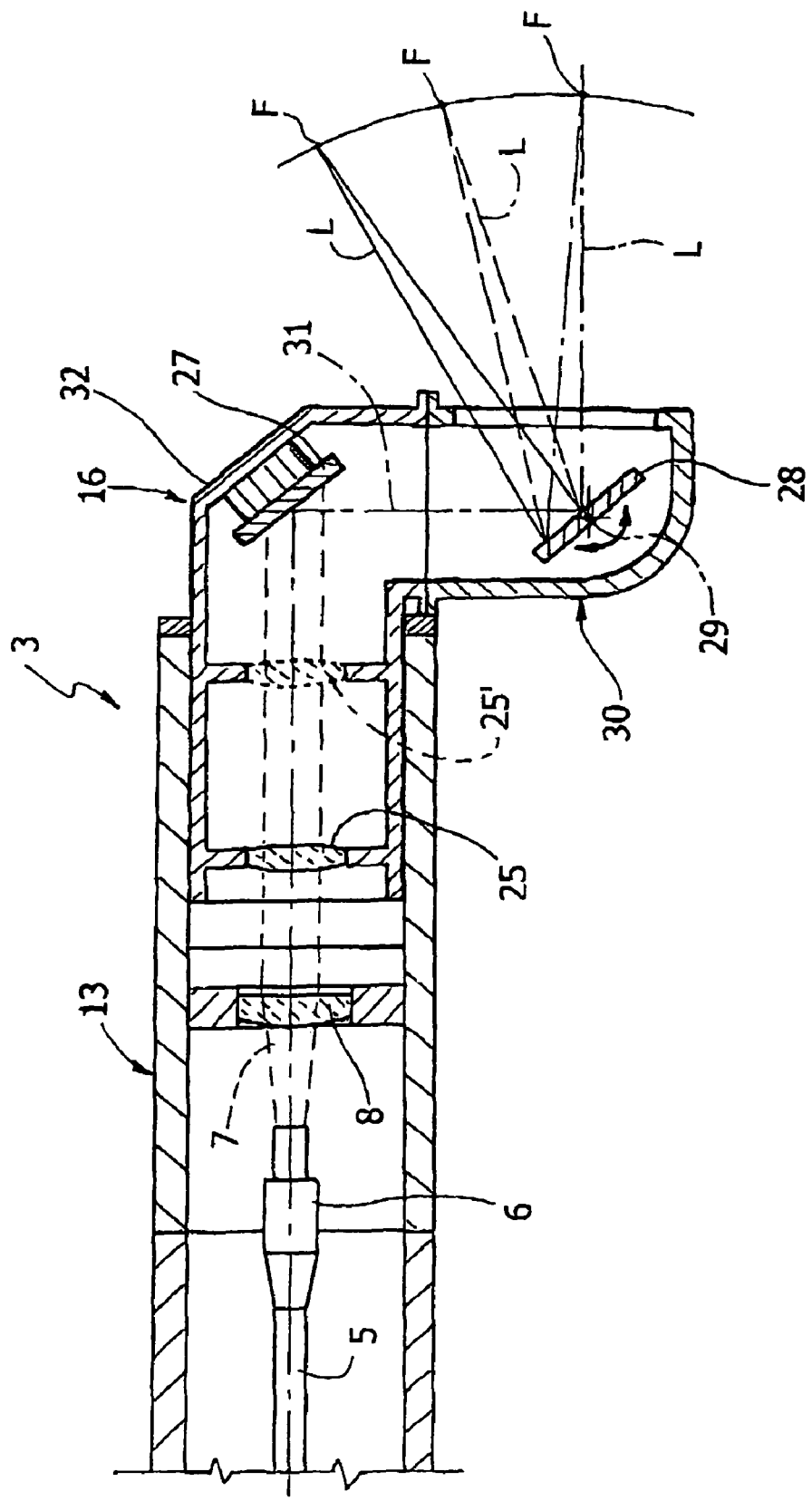
FIG. 4 illustrates a variant of FIG. 3.

FIG. 4 illustrates a variant of FIG. 3, which differs therefrom in that it presents a different structure of the scanning system.

In FIG. 4, the parts in common with the ones illustrated in FIG. 3 are designated by the same reference numbers. In this case, the divergent laser beam 7 at output from the torch 6 is collimated by a fixed lens 8, enters a focusing system constituted by a single mobile lens from the position 25 to the position 25' (FIG. 4), and is reflected by a fixed mirror 27 and then by a mobile mirror 28, which can oscillate about an axis 29 and is carried by a structure 30 that is able to turn about an axis 31 with respect to a structure 32, which carries the fixed mirror 27 and is connected to the structure 13.

Figure 5:
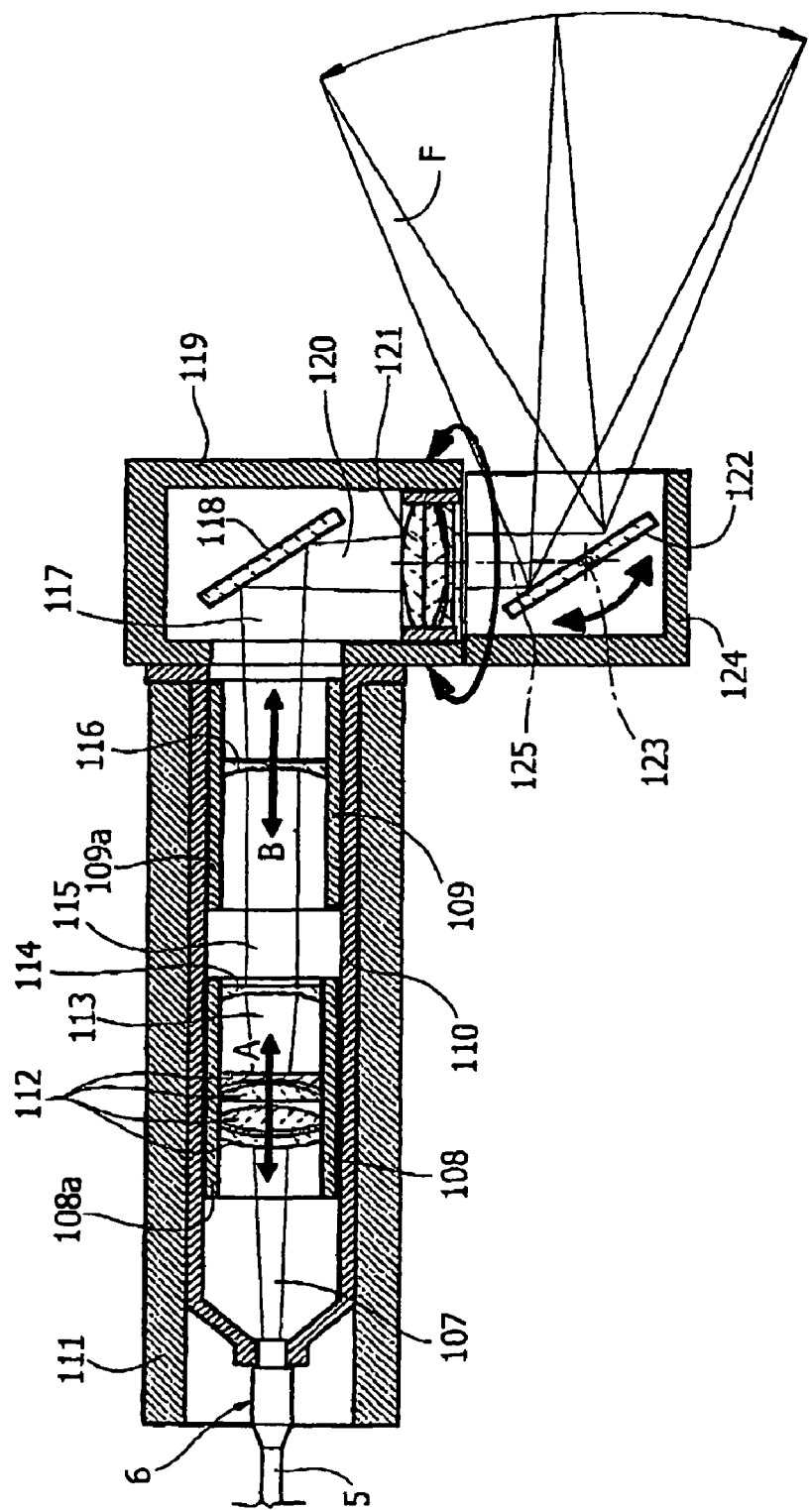
FIG. 5 shows a diagrammatic sectional view of a second embodiment of the device according to the invention.

In the diagrammatic illustration of FIG. 5, each of the two optical groups 108,109 has a body 108a,109a which is mounted within a tubular bushing 110 at which end the optical torch 6 is inserted.

The drawing does not shown neither the way with which the movable lenses of each optical groups 108,109 are driven with respect of the body of the respective group, nor the motor means which drive the controlling axial movement of such lenses, nor the mechanical transmission associated therewith, as such constructive details can be carried out in any known way, and the removal of such details from the drawings makes these latter of a prompter and easier understanding. However, it is important to notice that, as it will be seen in the following as well, the axial movements for controlling the lenses of the optical group 108 and of the optical group 109 have to be coordinated together. This can be obtained, according to the present invention, both by an adequate electronic control of the motor means which drive the control shifting of the lenses of the optical group 108 and of the optical group 109, and, alternately, by arranging an adequate mechanical transmission (for instance a cam transmission) between the movable parts of the two optical groups 108, 109, which allows the advantage, on one hand, of arranging motor means only for one of such groups and, on the other hand, of avoiding the need of an electronic control of the coordinated movements of such groups.

In the case of the specific illustrated example, the tubular bushing 110 is arranged within a tubular body 111, which represents an element (an arm) of the robot, in the event of an integrated solution within the robot structure. However, the device of the invention could also be an accessory device separated from the robot, for example which can be mounted on the wrist of an articulated robot.

In the illustrated example, the optical group 108 is a zoom modulus of collimation, including a first series of lenses 112 axially movable, from which a divergent beam 113 with a widened diameter exits, and one or more fixed lenses 114 for the collimation of the beam. The collimated laser beam 115 exiting from the collimation modulus 108 pass through at least a lens 116 constituting the second optical group 109, so as to transform it in a divergent beam 117 with a relatively wide diameter. The coordinated movement of axial control of the lenses of the two optical groups 108, 109 allows to change the diameter of the divergent beam exiting from such groups. The beam 117 is rotated of 90° from a fixed mirror 118 carried from a support structure 119 which is fixed to the tubular body 110 of the device. The divergent beam 120 reflected by the mirror 118 is focused by a fixed focusing modulus 121, comprising one or more connected lenses stiffly supported from the structure 119. The focusing modulus 121 is able to focus the beam with a cone of a predetermined angle, but of course the focusing distance of the beam, i.e. the distance of the focusing point from the focusing modulus 121 varies depending upon the diameter with which the beam 120 arrives to the focusing modulus 121. The focused beam, shown by F, is reflected by a mirror 122 having two oscillation axes orthogonal each other. In particular, the mirror 122 is pivotally supported around an axis 123 by a support structure 124 which is in turn rotatably supported by the structure 119 around an axis 125. Also in this case, the diagrammatic drawing of FIG. 5 does not show the motor means which control the oscillation of the mirror 122 around the two axes 123, 125, as such motor means can be carried out in any known way and the removal of such details from the drawings makes these latter of a prompter and easier understanding. The device according the invention then foresee motor means for the coordinated control of the axial positions of the two optical groups 108, 109, for the purpose of changing the focusing distance of the laser beam F, and motor means for controlling the two oscillation axes 123, 125 of the oscillating mirror 122, in order to orientate the focused laser beam F in the space. The focusing point of the laser beam F may thus shift within the volume of predetermined three-dimensional space, corresponding to the working needs of the device.

The possibility of changing the focusing distance allows to maintain unchanged the dimension (the diameter) of the illumination spot on the structure to weld when the distance of the focusing group from the structure varies, thus ensuring the obtainment of an even welding quality. Further, the possibility of orientating the laser beam obviously allows to carry out the welding according to the principles of the remote welding and particularly by orientating the laser beam during the shifting of the device by the robot, so that the welding spot on the structure moves according a path and/or a rate which do not closely depend on the path and/or the rate with which the robot moves the device. As already above shown, the device above illustrated may constitute an accessory device which can be mounted on the wrist of a commercial robot, or it may be integrated within the same structure of the robot.

A further preferred feature of the invention is that the device according to the invention may be equipped with a device for sensing the distance from the structure to weld, and with means apt to automatically adjusting the focusing distance, by controlling the axial positions of the optical groups 108,109 depending upon the sensed distance.

Naturally, without prejudice to the principle of the invention, the details of construction and the embodiments may vary widely with respect to what is described and illustrated herein purely by way of example, without thereby departing from the scope of the present invention.

What is claimed is:

1. A device for the laser welding of a structure made up of elements of sheet metal, comprising:

a manipulator robot with a number of axes, which includes a plurality of electric motors, which control the movement of component elements of the robot about said axes, and a programmable electronic control unit, for controlling said electric motors for the purpose of displacing a terminal component element of the robot according to any position, orientation, and path within a first predetermined three-dimensional space;

said manipulator robot being provided with a device having at least one linearly mobile lens moveable in a direction parallel to a laser beam axis originating from a laser torch for adjustable focusing of a laser beam from the terminal component element to a desired target weld point on the sheet metal structure and for orienting the focused laser beam within a second predetermined three-dimensional space, the at least one linear mobile lens comprising a first and second optical groups arranged in series along the laser beam axis, for adjustably focusing the laser beam by shaping the laser beam with a predetermined diameter, the second optical group comprising a linearly mobile lens adapted for causing the beam to diverge, the device further having a fixed mirror for reflecting said laser beam of a predetermined diameter, a fixed focusing modulus of the laser beam reflected by said fixed mirror, and mirror means orientable around two axes orthogonal therebetween, for reflecting the focused laser beam according to a direction orientable in space;

said control unit being programmed for displacing the aforesaid terminal component element of the robot along a simplified path in the proximity of, but not closely adjacent to, various areas of the structure to be welded, further programmable electronic control means are provided for controlling the aforesaid device for focusing and orienting the laser beam, in such a way that, whilst the terminal component element of the robot follows the aforesaid simplified path, the focused laser beam is oriented in the direction of all the various areas of the structure to be welded, and for each area it executes a laser-welding stretch or bead;

wherein the further programmable electronic control means are programmed so that the laser beam spot on the structure to be welded is moved with respect thereto in the longitudinal direction of each stretch of weld at a speed which is not closely dependent from the speed of movement of said terminal component of the robot; and wherein during the movement of said manipulator robot, said terminal component element is able to adjustably focus the laser beam through linear movement of the mobile lens to keep a given area of the structure to be welded still illuminated, while the manipulator robot has already moved on.

2. The device according to claim 1, wherein the scanning device further comprises a focusing lens set downstream of the mirror means, said lens being of the F-theta type.

3. The device according to claim 1 further comprising a first collimating lens and a second collimating lens having the at least one linearly mobile lens positioned between the two collimating lenses for adjusting the focusing distance of the laser beam.

4. The device according to claim 3, wherein, upstream of the first collimating lens there is set an optical system coupled to the extreme end of an optical fibre which guides the laser beam coming from the laser source.

5. Device according to claim 1, wherein said first optical group includes a plurality of lenses including a linearly mobile lens, the plurality of lenses suitable for collimating the beam at a variable diameter with respect to that of input in said optical group.

6. Device according to claim 1, wherein said mirror means include a single mirror pivotally mounted around an axis on a support which is in turn rotatably mounted with respect to a fixed structure carrying the focusing modulus around an axis orthogonal to the aforesaid oscillation axis of the mirror.

7. Device according to claim 1, wherein said optical groups and said oscillating mirror means are driven by respective motor means controlled by electronic control means.

8. Device according to claim 7, wherein said electronic control means are integrated within the programmable control unit of the robot.

9. Device according to claim 1, wherein the two optical groups are connected together by a mechanical transmission which renders the adjustment axial movements of the two optical groups dependent from each other according to a predetermined correlation.

10. Device according to claim 1, wherein it is provided with means for sensing the distance of the device from a structure to be welded and for controlling the adjustment position of the aforesaid optical groups for varying the focusing distance of the laser beam depending upon the aforesaid sensed distance.

11. A robotic laser welding device for use in welding sheet metal, the device comprising:

a laser source for producing a laser beam along a laser axis operable to a create a plurality of sequentially positioned welds at respective weld target areas collectively defining a laser beam path of travel;

a multi-axis robot connected to the laser source having a terminal end positionable by the robot in 3-dimensional space, the terminal end moveable along a simplified terminal end path of travel positioned laterally distant from and linearly shorter than the laser beam path;

an electronically actuated linearly mobile lens positioned along the laser axis for actively adjusting the focusing distance of the laser between the terminal end moving along the simplified terminal end path of travel and the respective sequential weld target areas along the laser beam path of travel; and an adjustable mirror for angularly deflecting the laser beam with respect to the terminal end toward the respective sequential weld target areas, wherein the laser beam remains angularly adjusted and focused on the respective weld target area while the terminal end continues moving along the terminal end path of travel.

12. The device of claim 11 wherein the linearly mobile lens is positioned adjacent to and downstream of a collimating lens.

13. The device of claim 11 wherein the linearly mobile lens comprises a first linearly mobile lens and a second linearly mobile lens positioned along the laser axis and are independently moveable with respect to each other.

14. The device of claim 11 wherein the linear mobile lens is linearly moveable along an undeflected laser axis originating from a laser torch.

15. A method for laser welding of a structure made up of elements of sheet metal, in which a succession of straight welding stretches or beads are to be made which define a laser beam path, said method comprising:

providing a manipulator robot with a number of axes, which includes a plurality of electric motors, which control the movement of component elements of the robot about said axes, and a programmable electronic control unit, for controlling said electric motors for the purpose of displacing a terminal component element along a simplified terminal path which is located in proximity to but is positioned laterally distant from and is linearly shorter than the laser beam path;

said manipulator robot is provided with a device for focusing a laser beam and with means for changing the distance at which the laser beam is focused;

further programmable electronic control means are provided for controlling the aforesaid device for focusing and orienting the laser beam in such a way that, while the terminal component element of the robot travels along the simplified terminal path, the laser beam spot is moved along said laser beam path at a speed which is not closely dependent from the speed of movement of said terminal component element of the robot; and wherein during the movement of said manipulator robot, said terminal component element is able to perform a given stretch or bead of said succession, while having already moved further along the terminal path to the proximity of an area of said structure wherein another stretch or bead of said succession is to be performed.

16. A device for the laser welding of a structure made up of elements of sheet metal, said device being for performing a succession of straight welding stretches or beads which define a laser beam path, said device comprising:

a manipulator robot with a number of axes, which includes a plurality of electric motors, which control the movement of component elements of the robot about said axes;

a programmable electronic control unit, for controlling said electric motors for the purpose of displacing a terminal component element of the robot along a simplified terminal component path positioned proximate but laterally spaced from the laser beam path having a length shorter than the laser beam path;

said manipulator robot being provided with a device for focusing of a laser beam and for orienting the focused laser beam and having means for changing the distance at which the laser beam is focused;

further programmable electronic control means for independently moving the terminal element along the simplified terminal component path while the focused laser beam moves along the distant laser beam path to selectively make the welding beads, said further electronic control means having means for controlling the aforesaid device for focusing and orienting the laser beam along said laser beam path at a speed which is not closely dependent from the speed of movement of said terminal component element along the terminal component path; and wherein during the movement of said manipulator robot, said terminal component element is able to perform a given stretch or bead of said succession, while having already moved to the proximity of an area of said structure wherein another stretch or bead of said succession is to be performed.

17. The device of claim 13 wherein the first mobile lens and the second mobile lens are positioned in a tubular bushing which is positioned in a tubular body, the first and the second mobile lenses linearly moveable relative to the respective tubular bushing.

18. The device of claim 17 wherein the first mobile lens comprises a first optical group having two linearly moveable lenses and a fixed collimating lens successively positioned along the laser axis in the tubular bushing.

19. The device of claim 13 wherein respective movement of the first mobile lens and the second mobile are coordinated with each other to selectively adjust the diameter of the laser beam.

* * * * *